United States Patent [19]
Nagata

[11] Patent Number: 5,647,610
[45] Date of Patent: Jul. 15, 1997

[54] STEERING WHEEL WITH AIR BAG DEVICE

[75] Inventor: Atsushi Nagata, Aichi, Japan

[73] Assignee: Toyoda Gosei Co., Ltd., Aichi, Japan

[21] Appl. No.: 606,308

[22] Filed: Feb. 23, 1996

[30] Foreign Application Priority Data

Apr. 28, 1995 [JP] Japan ................................. 7-105847
Apr. 28, 1995 [JP] Japan ................................. 7-105861

[51] Int. Cl.$^6$ .................................................. B60R 21/16
[52] U.S. Cl. ....................................................... 280/731
[58] Field of Search ................................. 280/731, 732, 280/743.1

[56] References Cited

U.S. PATENT DOCUMENTS

| 5,198,629 | 3/1993 | Hayashi et al. | 280/731 |
| 5,338,059 | 8/1994 | Inoue et al. | 280/731 |
| 5,371,333 | 12/1994 | Kanai et al. | 280/731 |
| 5,577,766 | 11/1996 | Niwa et al. | 280/731 |

FOREIGN PATENT DOCUMENTS

| 63-16267 | 2/1988 | Japan . |
| 63-134368 | 6/1988 | Japan . |
| 2-24691 | 7/1990 | Japan . |
| 2-133955 | 11/1990 | Japan . |
| 5-2388 | 1/1993 | Japan . |
| 6-305427 | 11/1994 | Japan . |

*Primary Examiner*—Kenneth R. Rice
*Attorney, Agent, or Firm*—Cushman Darby & Cushman Intellectual Property Group of Pillsbury Madison & Sutro LLP

[57] ABSTRACT

A steering wheel equipped with an air bag device. A steering wheel body consists of a core member and a cover member which comprises a core covering portion and a top covering portion which has a door portion which, when an air bag inflates, will open by tearing the tearing portion. The steering wheel body has an insert buried, that comprises a top portion which is located in the door portion and a stem portion which is located in the covering layer and which is connected to the top portion by means of a flexible coupling portion. A bottom member which is located in the lower part of the boss portion combines with cover layer to hold an air bag device between these two members and has a connecting portion located in such a way that the upper end of the steering shaft can be connected from below to the bottom member, which is coupled to spoke cores by means of bolts.

19 Claims, 8 Drawing Sheets

FIG. 6
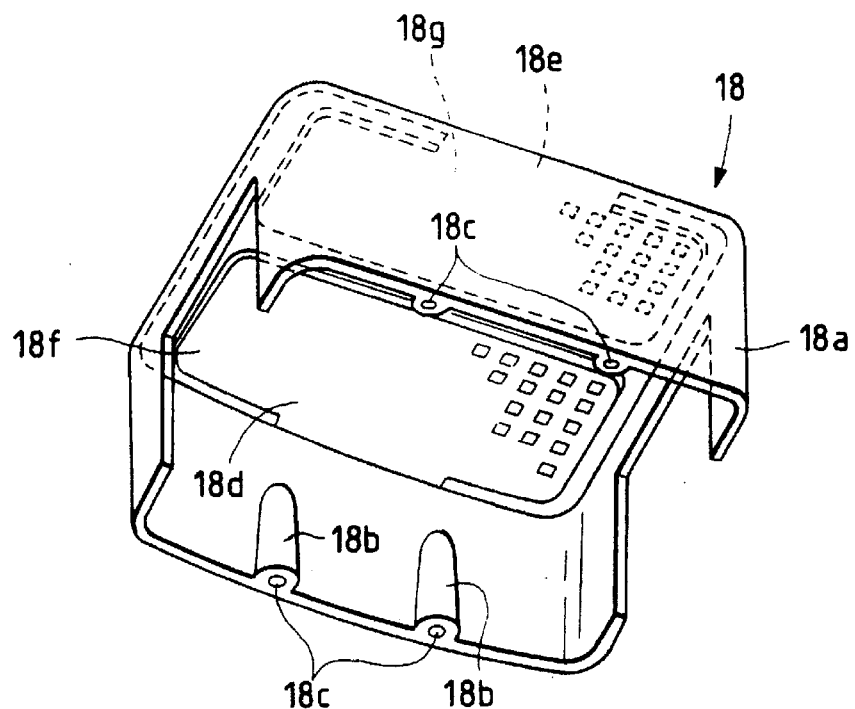
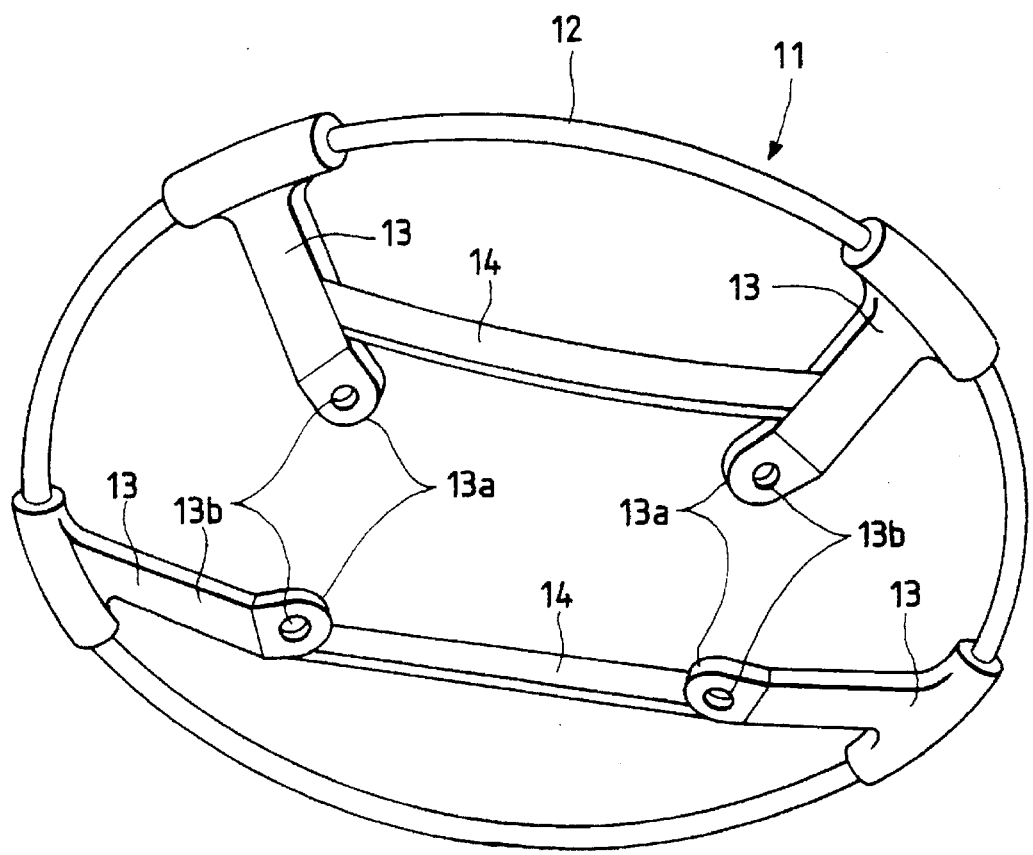

ent cover that enables the air bag to inflate smoothly as required.
STEERING WHEEL WITH AIR BAG DEVICE The priority applications, Japanese Patent Application No. Hei 7-105847, filed in Japan on Apr. 28, 1995, and Japanese Patent Application No. Hei 7-105861, filed in Japan on Apr. 28, 1995, are hereby incorporated herein by reference.

BACKGROUND OF THE INVENTION

1. Field of the Invention

The present invention relates to a steering wheel, including an air bag device, that has a very soft outer cover and yet includes a membrane type horn switch in an exterior cover, located at a position between the air bag and the outer cover.

2. Description of the Prior Art

A conventional steering wheel with an air bag device is disclosed in Japanese Patent Publication No. Hei. 6-305427. This steering wheel has essentially an annular steering ring portion, a boss portion located at the center of the ring portion, for connection to the upper end of a steering shaft. Spoke portions extend between the ring portion and the boss portion. The air bag device is mounted on the boss portion.

The steering wheel has an exterior pad, including an assembled air bag and an inflator, and a steering wheel body that comprises the annular ring portion, the spoke portions and the boss portion.

The steering wheel body is comprised of a core portion and a cover portion made of a soft synthetic resin. The core portion is comprised of a ring core located in the annular ring portion, spoke cores located in the spoke portions to be coupled to the ring core, and a boss core located in the boss portion to couple the spoke cores together. The boss core is connected to the steering shaft which is inserted from below and secured at its upper end by means of a nut.

The cover portion covers not only the ring core but also the spoke cores each extending from the ring core to the nearby area of the pad. The pad, while covering the air bag device, is secured by being screwed to the spoke cores and the boss core which are components of the steering wheel body.

This conventional steering wheel with an air bag device is so adapted that the pad is mounted on the steering wheel body from above the boss portion and fixed by securing means such as screws. A conspicuous parting line appears on the upper side of the steering wheel on the spokes as a border between the center steering wheel body and the pad on the annular ring. This conspicuous parting line impairs the design of the steering wheel and is not desirable.

In order to assure that such a parting line is uniform around the periphery of the pad portion, the individual components must be assembled with high precision. This requires strict control over a variety of factors including the dimensional precision of the respective components and their assembly.

In addition, when the steering wheel is mounted on a vehicle, the steering shaft is secured to the boss core by means of a nut, with the pad then being removed. Thus, the pad is mounted to the steering Wheel. Thus, two steps, one being securing the steering wheel by means of a nut and the other, mounting the pad, are involved, thereby making it a time-consuming operation to fit the steering wheel on to the vehicle.

Meanwhile, Japanese Utility Model Publication No. Sho. 63-16267 discloses that the cover portion extends the upper part of the boss portion from the spoke portions and the boss core provides for a connecting portion which the steering shaft can connect. In short, no parting line will appear on the upper side of the steering wheel. Additionally, only the lower side of the steering wheel need be used to accomplish its mounting on the steering shaft and the steering wheel substantially can be connected to the steering shaft in a single step.

However, the steering wheel described in the above Publication does not include an air bag device and it is not easy to mount the air bag device on the boss portion.

Further, the provision of an air bag device requires that the cover portion should tear smoothly upon inflation of the air bag.

Another example of a conventional steering wheel with an air bag device having a membrane horn switch is described in Japanese Patent Publication No. Hei 6-305425, now U.S. Pat. application Ser. No. 08/216,824.

This steering wheel comprises an annular ring portion, a boss portion, located at the center of the ring portion, that is connected to the upper end of a steering shaft, and spoke portions for connecting the ring to the boss portions together. The air bag device is also mounted on the boss portion.

The boss portion includes a rigid support plate located over the folded air bag. A membrane type horn switch is located on the upper side of the support plate. An outer cover, made of a thermoplastic polyester-base elastomer, extends over the horn switch.

The outer cover is provided with weakened areas that define door portions that open when the air bag in the air bag device inflates. The horn switch and the support plate are located within the door portions.

The underside of the door portions of the outer cover are provided with a plurality of downwardly extending mounting projections. The support plate is provided with a plurality of mounting holes in correspondence with those mounting projections which are received in and engaged by respective mounting holes.

In a conventional steering wheel, the support plate is retained on the outer cover, made of a thermoplastic elastomer. The outer cover can retain the support plate by the outer cover itself since it has the necessary rigidity despite its comparative softness.

If the outer cover is formed of soft polyurethane, because the support plate has its own rigidity, the thermoplastic elastomer has rigidity (unlike soft polyurethane which is more elastic to provide a better feel than the thermoplastic elastomer), it is difficult to secure the necessary tensile strength by the soft polyurethane and the outer cover is no longer capable of retaining the support plate such that the membrane switch can be provided above the air bag.

SUMMARY OF THE INVENTION

The present invention has as a first object of providing a steering wheel equipped with an air bag device that has an improved external appearance and can be connected to a steering shaft as a single component in a single operation. Another feature is to improve installation and to have a cover that enables the air bag to inflate smoothly as required.

The present invention has an additional objective of providing a steering wheel equipped with a membrane switch in an outer cover formed of soft polyurethane which still permits the membrane switch to be easily positioned without problems.

The above-stated objects of the present invention can be attained by a steering wheel equipped with an air bag device that comprises a ring portion, a boss portion located centrally of the ring portion with the lower part of the boss being connected to the upper end of a steering shaft, and spoke portions for connecting the ring and boss portions together. The air bag device is mounted on the boss portion.

From another view, the steering wheel of the present invention comprises a steering wheel body that comprises a ring portion, the spoke portions and the upper part of the boss portion, and a bottom member that is located in the lower part of the boss portion to hold the air bag device. The steering wheel body is comprised of a core portion and a cover portion made of a soft synthetic resin. The core portion comprises a ring core located in the ring portion and spoke cores located in the spoke portions to be coupled to the ring core.

The cover material covers the ring core and the spoke cores, and extends from the core areas across the upper part of the boss portion. The cover material also includes door portions that, when the air bag inflates, will open along tearing lines.

The cover includes an embedded insert that has a greater tensile strength than the covering material. The insert comprises top portions that become buried in door portions of the covering, a stem portion buried in the core covering portion, extending from the peripheral edges of the top covering portion downward, and flexible coupling portions for coupling the top insert portions and the stem portion at the hinges along which the door portions may ultimately open.

The bottom member combines with the top covering portion to hold the air bag device provided therebetween. The bottom member has a connecting portion located on its underside, by which the upper end of the steering shaft can be connected from below to the bottom member, which is coupled to the spoke cores by securing means.

A rigid support plate is located above the folded air bag, and the membrane switch is located on the upper side of the support plate. The cover is made of the soft polyurethane material.

The steering wheel of the present invention is such that the cover has not only a core covering portion, which covers the ring core and the spoke cores, but also a top covering portion which extends from the core covering portion across the upper part of the boss portion. As a result, no parting line appears on the upper side of the steering wheel thereby contributing to a better upper side design.

Additionally, the steering wheel of the invention is such that the bottom member has a connecting portion located on its underside by which the upper end of the steering shaft can be connected from below to the bottom member. Consequently, only the lower side of the steering wheel need be used to accomplish its mounting on the steering shaft in a single step.

The air bag device is provided and held between the bottom member and the top covering portion. To assemble the steering wheel, one may simply provide and hold the air bag device, including a folded air bag, on top of the bottom member and use suitable securing mean to couple the bottom member to the spoke cores of the steering wheel body. During the assembly operation, the boss portion of the steering wheel body has only the top covering portion located thereon, leaving sufficient space therebelow thus permitting the air bag device to be easily mounted.

If the air bag in the air bag device inflates, door portions formed in the top covering portion are pushed open by the inflating air bag. Since the top portions of the insert which are coupled to and extend from the stem portion are buried in the core covering portion via the coupling portions also buried in the door portions, the latter will not shatter but open smoothly enough to insure that the air bag is inflated to its full extent. Having a higher tensile strength than the core and top covering portions, the insert will satisfactorily counteract the tensile force that develops as the door portions are opening.

The terms "upper" and "lower" and related words as used herein are referenced to the direction parallel to the axis of the steering shaft and they have nothing to do with the actual orientation of the steering wheel as it is mounted on a vehicle.

BRIEF DESCRIPTION OF THE DRAWINGS

FIG. 6 is a perspective view showing a disassembled state of a steering wheel body.

DETAILED DESCRIPTION OF THE PREFERRED EMBODIMENT

Figure 1:
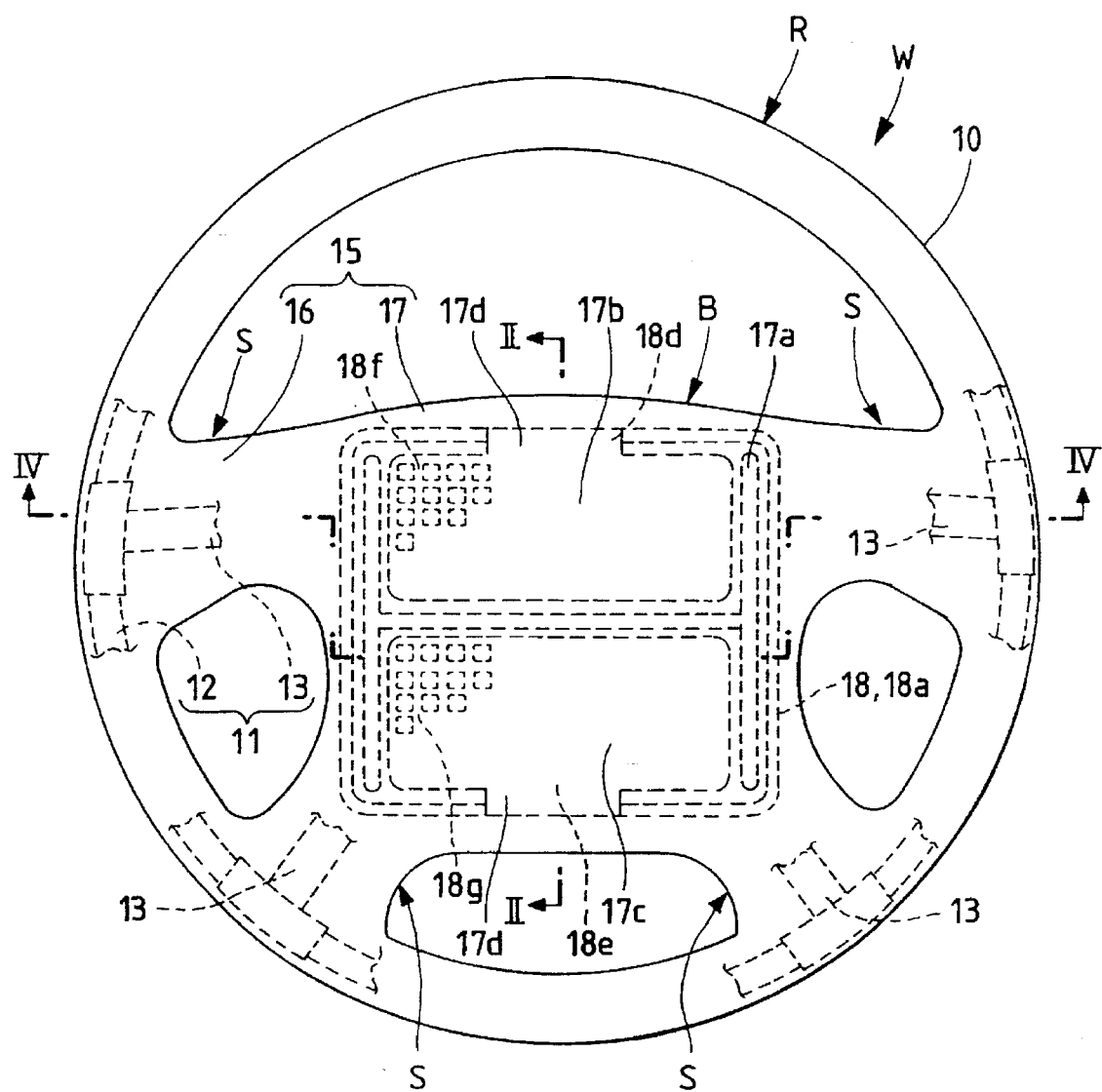
FIG. 1 is a plan view of a steering wheel in an embodiment of the present invention.
Figure 7:
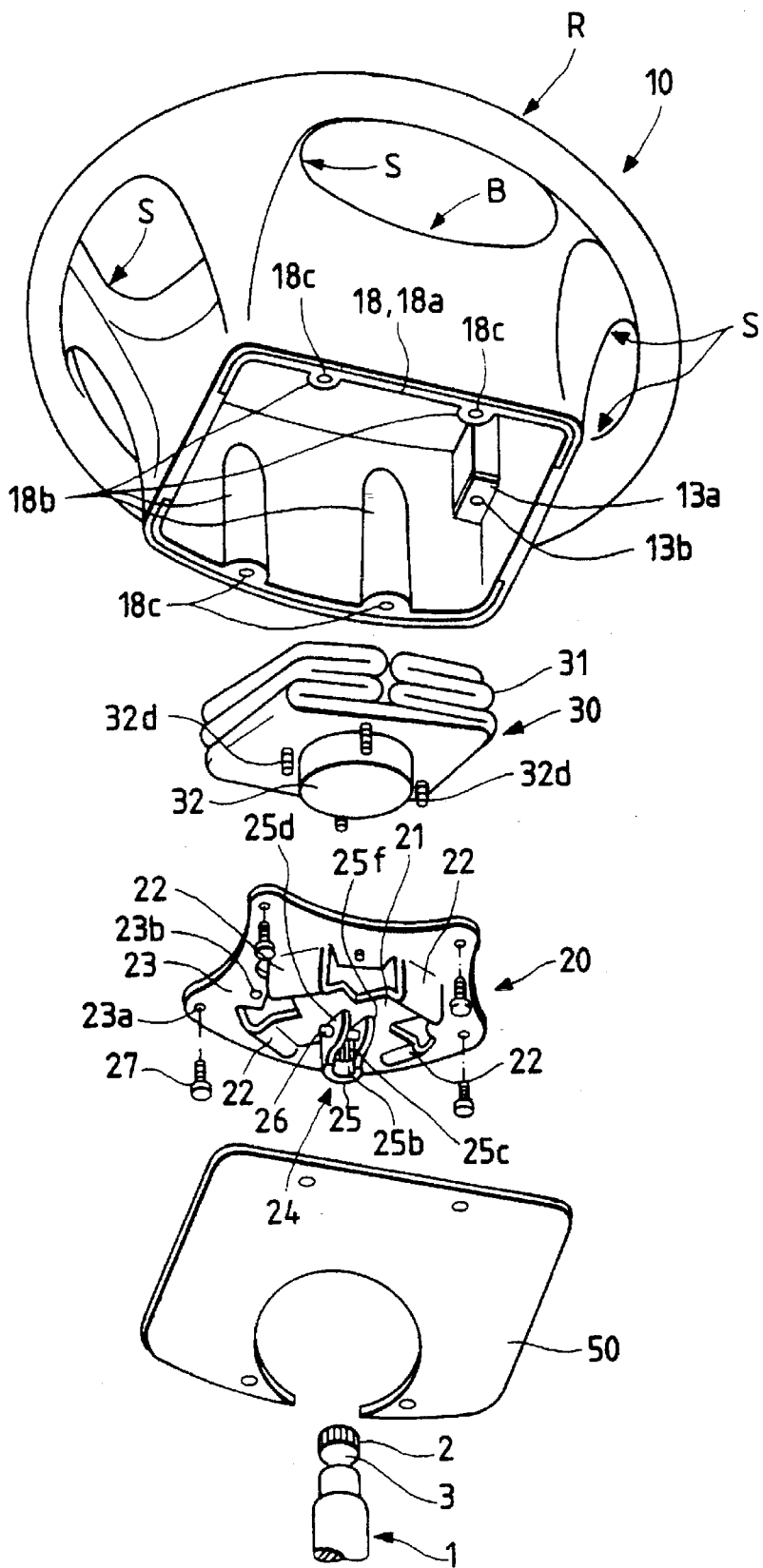
FIG. 7 is a perspective view showing a disassembled state of the steering wheel.

As shown in FIGS. 1 and 7, the steering wheel W comprises an annular ring portion R, a boss portion B, located at the center of the annular ring portion R and which has its underside connected to the top end of a steering shaft 1, and four spoke portions S for connecting the annular ring portion R to the boss portion B.

Figure 2:
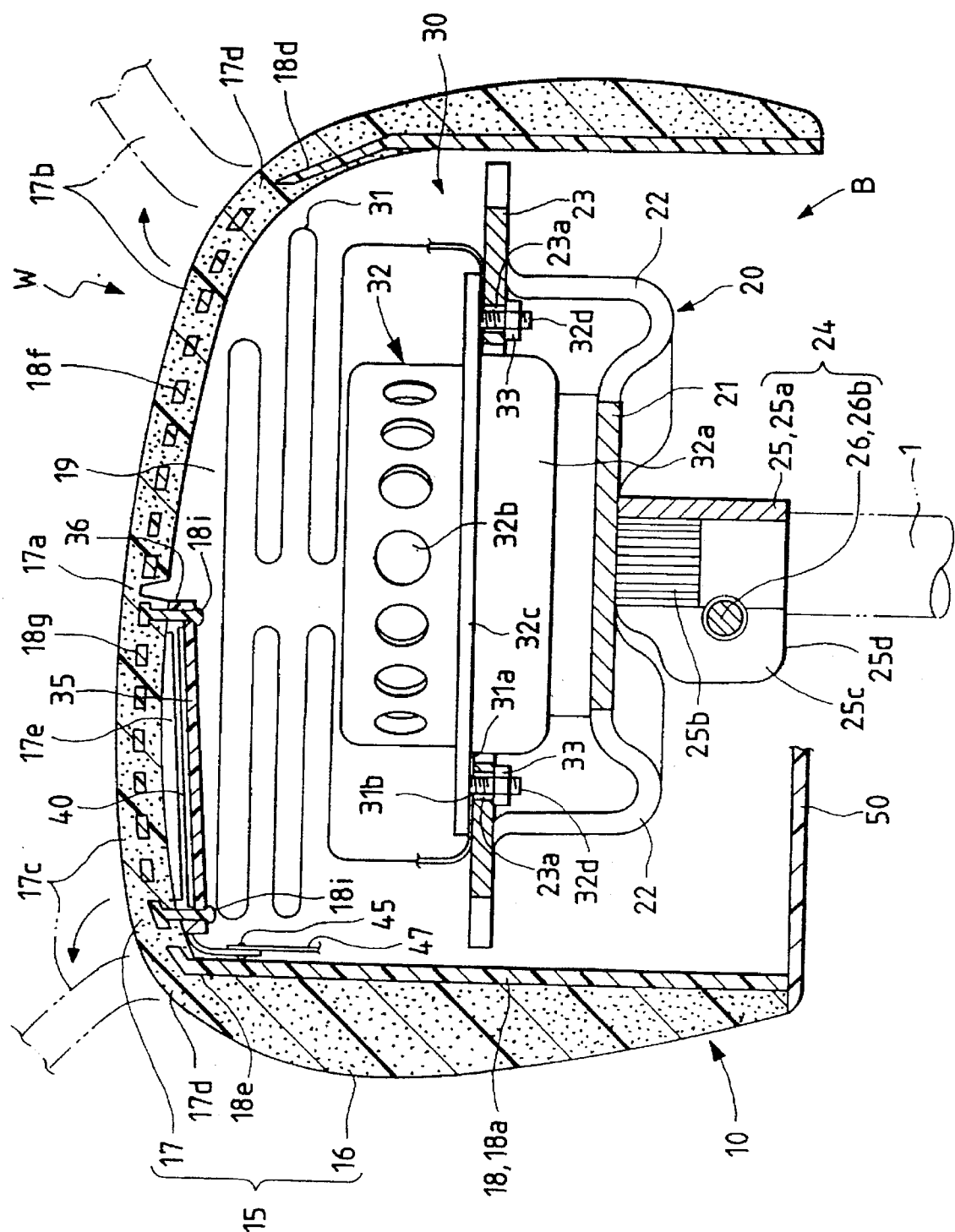
FIG. 2 is a sectional view taken along line II—II of FIG. 1.
Figure 4:
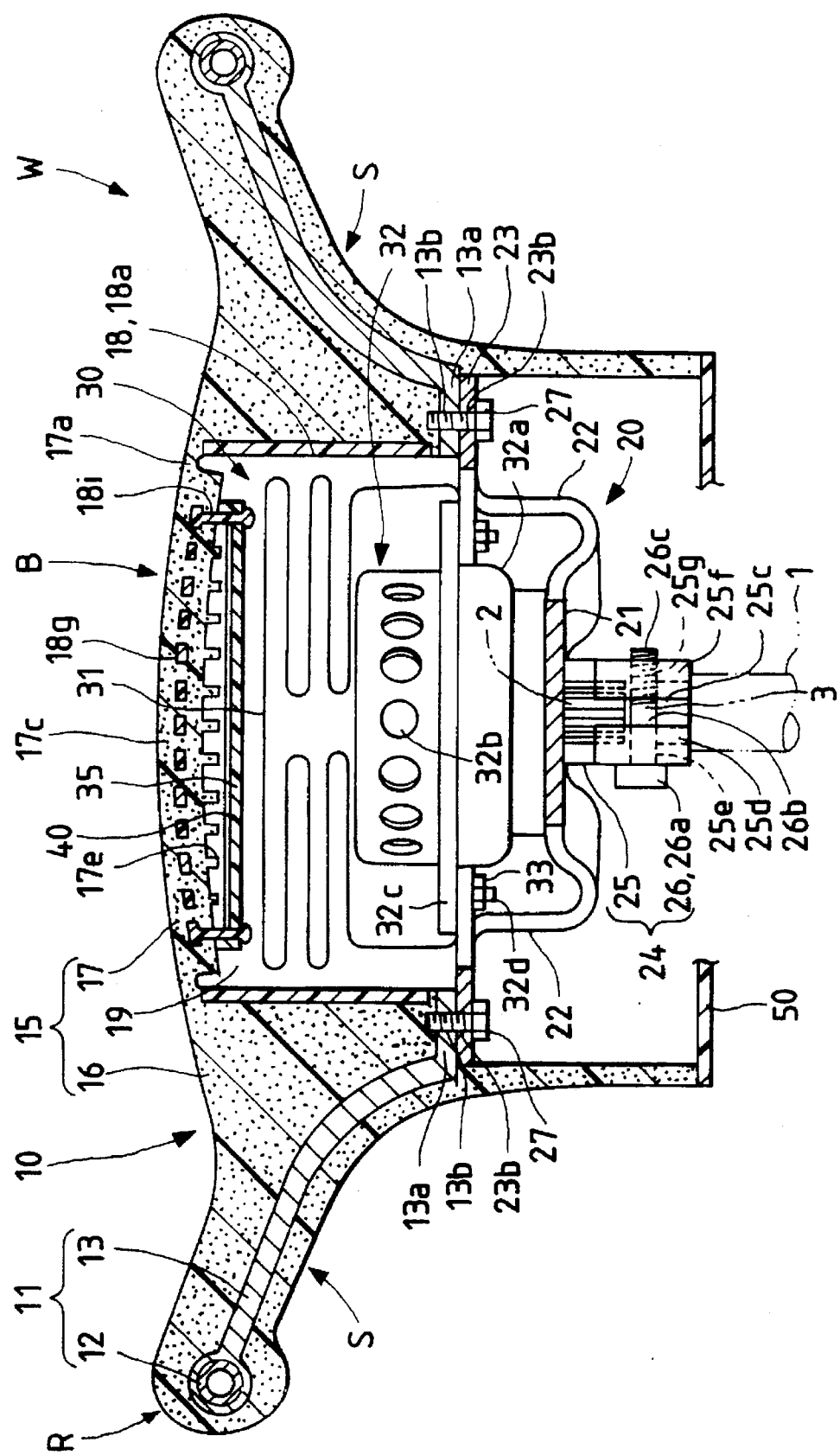
FIG. 4 is a sectional view taken along line IV—IV of FIG. 1.

As shown specifically in FIGS. 2, 4 and 7, the steering wheel W comprises a steering wheel body 10, that includes the annular ring portion R, several spoke portions S and an upper part of the boss portion B, a bottom member 20 located in the lower part of the boss portion B, and an air bag device 30 held on the bottom member 20.

The steering wheel body 10 is itself comprised of a core portion 11 and an outer cover portion 15 made of a soft synthetic resin.

As shown in FIGS. 1, 2, 4 and 6, the core portion 11 includes a ring core 12, located within the annular ring portion R, and four spoke cores 13 located within the respective spoke portions S to be coupled to the ring core 12. The ring core 12 is preferably formed of a steel tube, whereas each spoke core 13 is preferably die cast from a light metal, such as an aluminum alloy, around the ring core 12 such that it is coupled thereto. Each spoke core 13 is formed in such a way that it extends from the ring core 12 to slope down radially inwardly, with a lateral plate portion 13a formed at a lower inner end. Each lateral plate portion 13a is angled relative to the upper portion and has a mounting hole 13b formed centrally therein. The inner surface of hole 13b can be provided with female threading. A support rod 14 couples two adjacent spoke cores 13 to reinforce them, as shown in FIG. 6.

The cover portion or cover 15 is formed of soft polyurethane. As shown in FIGS. 1, 2 and 4, the cover 15 comprises a core covering portion 16, which covers the ring core 12 and the spoke cores 13, and a top covering portion 17, which extends from each of the core covering portions 16 across the upper part of boss portion B.

The top covering portion 17 and the core covering portion 16 are formed so that each is continuous from the other, without any depressions or raised areas in the exterior surfaces thereof. An accommodating cavity 19, in the form of a rectangular prism which is surrounded by the core covering layer 16, is provided beneath the top covering portion 17.

As shown in FIGS. 1 and 2, the top covering portion 17 includes two rectangular sheet form door portions 17b and 17c, which are designed to open together when an air bag 31 inflates. A tearing portion 17a is integrally formed along the peripheral edges of the door portions 17b and 17c and it is sufficiently thin-walled to permit easy tearing when the air bag 31 inflates. This permits the areas around the edges of door portions 17b and 17c to open quickly enough to insure that the air bag 31 inflates to its full extent. The tearing portion 17a is H-shaped when seen from above. The areas of the top covering portion 17 where such a tearing portion 17a is not formed serve as hinge sites 17d for the door portions 17b and 17c. As shown in FIGS. 2 and 4, a plurality of ribs 17e which are capable of depressing a membrane switch 40 are formed to project from selected positions on the underside of one of the doors, such as 17c.

As shown in FIGS. 1, 2, 4 and 6, the cover 15 includes an insert 18 having net-like top portions 18f and 18g that become, following molding, buried in the door portions 17b and 17c, respectively. Insert 18 also includes a depending stem portion 18a, generally in a rectangular tubular form, with openings at opposite end walls, that is buried or embedded in the core covering portion 16 which extends downward from the peripheral edges of the top covering portion 17. Insert 18 also includes flexible coupling portions 18d and 18e which are buried in the associated hinge sites 17d and which couple the stem portion 18a to the top portions 18f and 18g, respectively. The insert 18 is molded as an integral member from synthetic resins such as olefinic, styrenic, polyester or other thermoplastic elastomers that have higher tensile strengths than that of the top covering portion 17 and the core covering portion 16. Coupling portions 18d and 18e are formed such that they are sufficiently thin-walled to insure flexibility but thick enough to counter or resist the tensile force that develops when the door portions 17b and 17c open upon inflation of the air bag 31.

Stem portion 18a has four mounting bosses 18b formed in selected positions on the inner circumference, with each having a mounting hole 18c through which a screw is inserted to secure a lower cover 50. Additionally, a plurality of mounting projections 18i, that help secure a support plate 35 on which the membrane switch 40 serving as a horn switch is placed, are provided at selected positions so that they protrude downwardly from the underside of the door portion 17c of the top covering portion 17.

Figure 3:
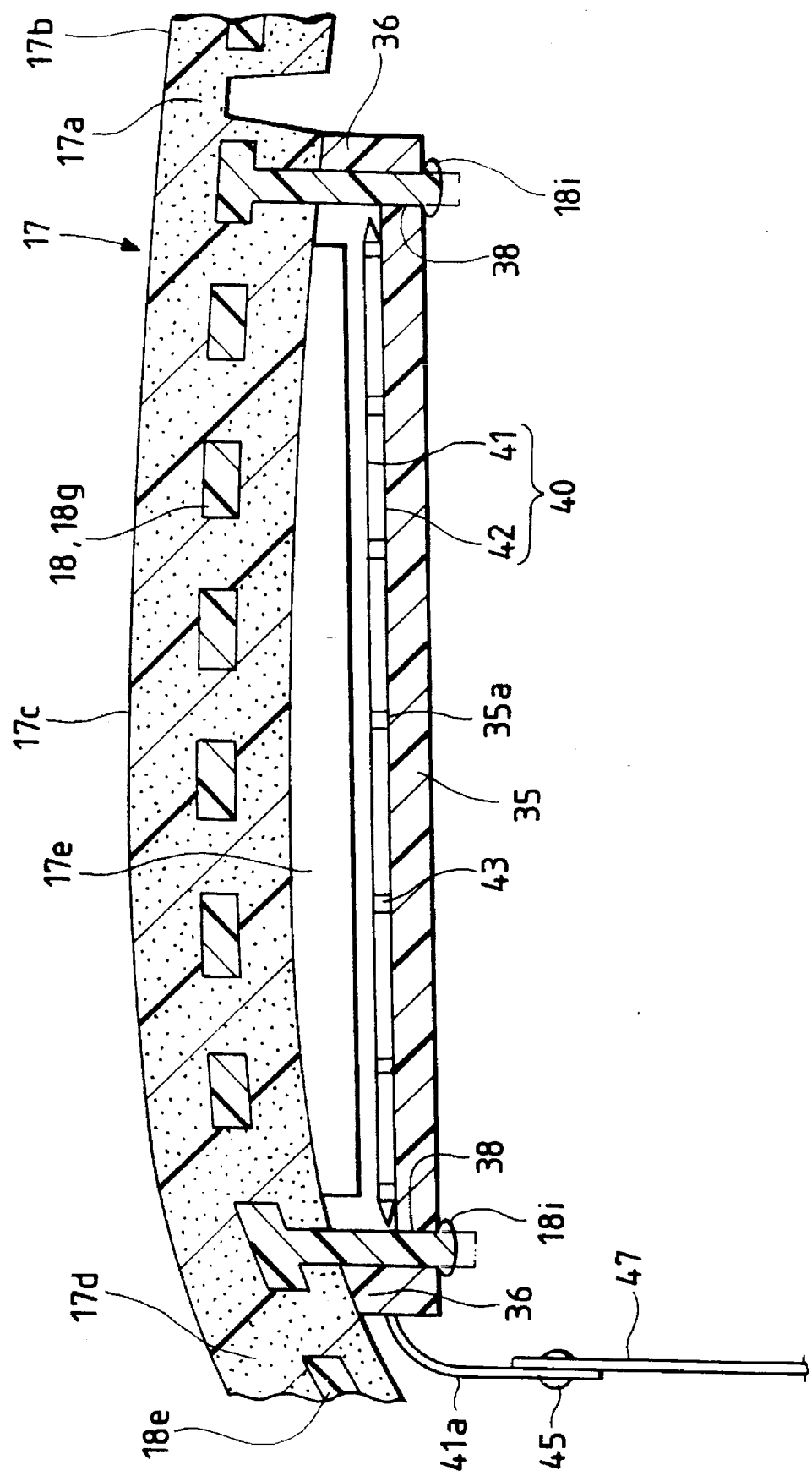
FIG. 3 is a partial enlarged view of FIG. 2.
Figure 5:
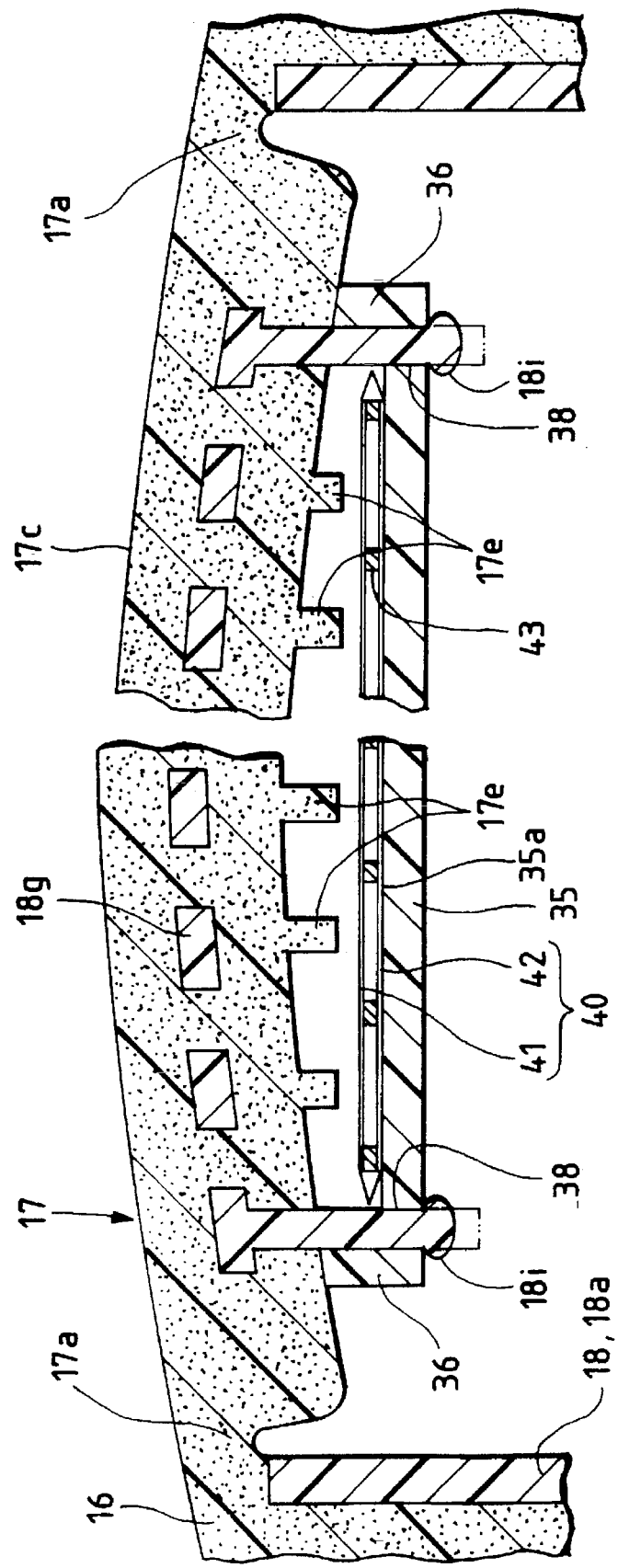
FIG. 5 is a partial enlarged view of FIG. 4.

Following molding, to secure the support plate 35 to the top portion 18g, mounting projections 18i are inserted into mounting holes 38 provided at predetermined positions in the support plate 35 and then the ends of projections 18i exposed through holes 38 are heated and thermally crimped to melt and securing the bulging ends as indicated in phantom in FIGS. 3 and 5.

Figure 8:
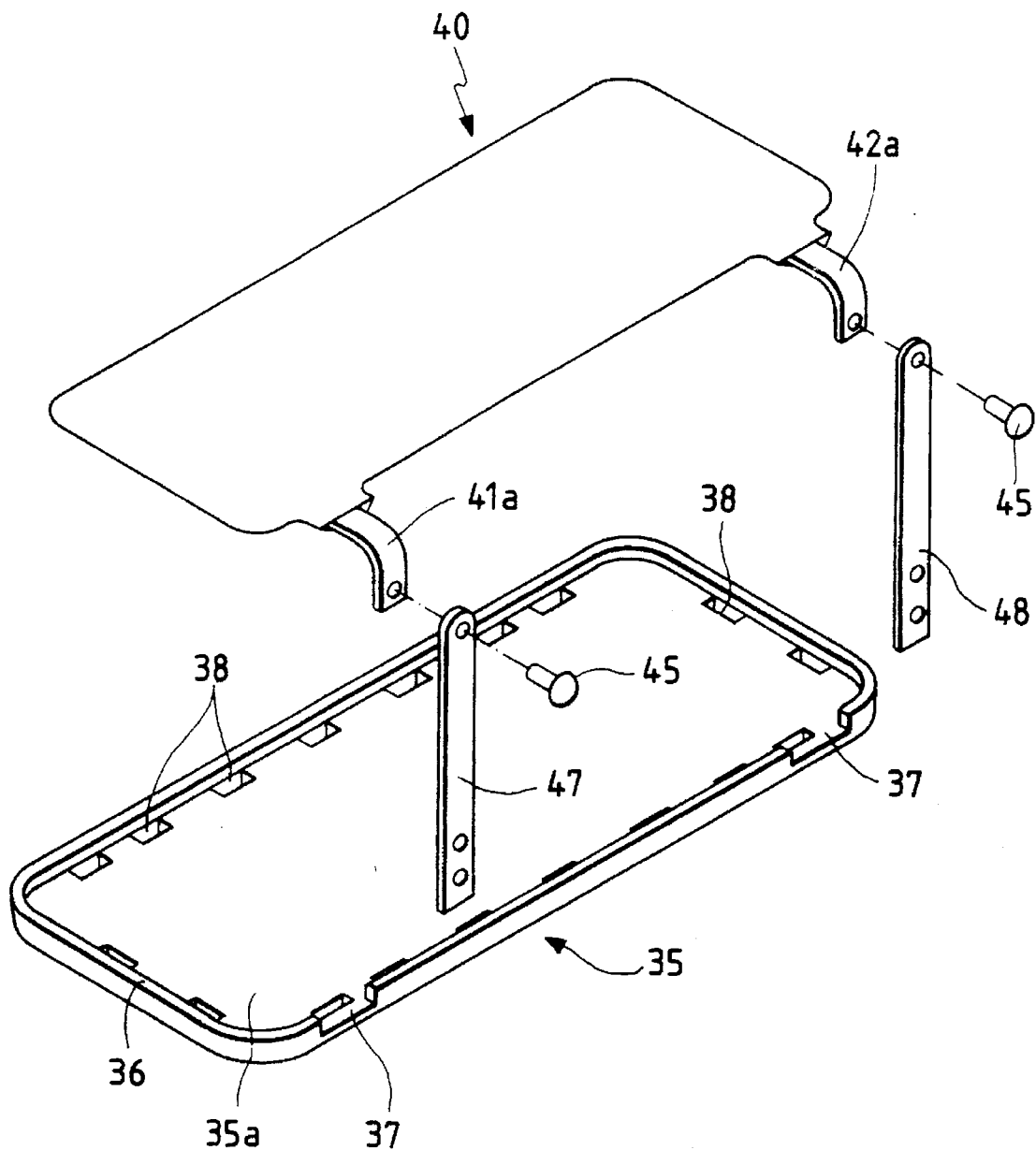
FIG. 8 is a perspective view of the support plate and the membrane switch which are used in the embodiment.

The support plate 35 is formed of synthetic resins, such as thermoplastic elastomers (e.g., olefinic, styrenic, polyester-based, etc.) and polypropylene, which are more rigid than the material from which insert 18 is formed. As shown in FIGS. 3, 5 and 8, the support plate 35 includes a gap defining projection 36 that extends the peripheral edge of upper surface 35a. Projection 36 engages the bottom surface of cover portion 17 to define a gap that equals the horn stroke. A plurality of mounting holes 38 are provided in nearby areas in such a way that the mounting projections 18i on the insert 18 can be inserted into those mounting holes. As shown in FIG. 8, two open areas are provided in the peripheral edge of the upper surface 35a as recesses 37, in which terminals 41a and 42a of the membrane switch 40 are to be placed.

The membrane switch 40 comprises an upper plate 41 typically made of phosphor bronze, a lower plate 42 typically made of stainless steel, and a multiple of insulating spacers 43 provided between the two plates 41 and 42 and which are made of an insulating material capable of deflection. The plates 41 and 42 have terminals 41a and 42a projecting from specified positions. Connecting plates 47 and 48 made of a conductive material are secured to the terminals 41a and 42a, respectively, by means of rivets 45, so that they are eventually connected to the positive and negative electrodes on a vehicle's horn actuating circuit.

The profile of the membrane switch 40 is defined by a protective film (not shown) covering the plates 41 and 42 in such a way that it provides a planar shape which, except at the sites of terminals 41a and 42a, covers the area of the support plate 35 inward of the mounting holes 38 in the top surface 35a. Spacers 43 are provided regularly at equal intervals between the two plates 41 and 42. When membrane switch 40 is fitted to the top portion 18g, ribs 17e, provided in the door portion 17c of the top covering portion 17, will be located in areas of the upper plate 41 which lie between spacers 43. This arrangement assures that whichever area of the door portion 17c, within the profile of the membrane switch 40, is pushed, a rib 17e will depress the area between adjacent spacers 43, thereby insuring uniformity in the load that is applied.

Turning again to FIGS. 2, 4 and 7, a bottom member 20 is formed of a light and ductile die castable metal such as an aluminum alloy. The bottom member 20 comprises a central base portion 21, an annular coupling ring portion 23 located on top of the base portion 21, and four deformable portions 22 that couple the base portion 21 to the annular coupling ring portion 23 and which are capable of plastic deformation.

The annular coupling ring portion 23 includes mounting holes 23a formed at positions outboard of the respective deformable portions 22 which correspond to the mounting holes 13b in the spoke cores 13. The mounting holes 23a are such that bolts 27 as securing means can be inserted as shown in FIG. 4. The coupling ring portion 23 also includes four retaining holes 23b formed in selected areas to permit the insertion of bolts 32d that extend downwardly from an inflator 32 in the air bag device 30.

The underside of the central base portion 21 has a connecting portion, generally indicated at 24, projecting downwardly in such a way that a steering shaft 1 can be connected from below to the bottom member 20. The connecting portion 24 comprises of a split sleeve 25 and a lock pin 26.

The lock pin 26 includes a head portion 26a and a shank portion 26b extending from the head portion 26a. The distal end of shank porion 26b is provided with a male thread portion 26c.

The split sleeve portion 25 has a serration 25b formed on its inner circumference in such a way that it corresponds to a serration 2 formed at the upper end of the steering shaft 1. The split sleeve portion 25 comprises a body 25a having an opening 25c that splits part of the peripheral wall in the axial direction, and two opposed flange portions 25d and 25f that project from the peripheral edges of the opening 25c radially outwardly of body 25a. Flange portion 25d has a hole 25e through which the shank portion 26b of the lock pin 26 can be inserted, whereas flange portion 25f has a threaded hole 25g into which the male thread portion 26c of the lock pin 26 can be threaded.

To connect the steering shaft 1 to the connecting portion 24, the following procedure may be taken. With the lock pin 26 removed from the split sleeve portion 25, the top end of the steering shaft 1 is inserted into the body 25a and the shank portion 26b of the lock pin 26 is passed through the hole 25e and the male thread portion 26c is threaded into the hole 25g, thereby reducing the diameter of the body 25a. At the same time, shank portion 26b is fitted into a recess groove 3 beneath the serration 2 of the steering shaft 1, whereby the connecting portion 24 is connected to the top end of the steering shaft 1.

As shown in FIGS. 2, 4 and 7, the air bag-device 30 comprises a folded air bag 31 and an inflator 32 for supplying the bag with a gas to inflate it. The air bag device 30 is held on the bottom member 20 with the aid of a flange portion 32c of the inflator 32 which is furnished with four downwardly extending bolts 32d.

The air bag 31 has an opening 31a formed in the bottom to permit the flow of an inflating gas into the bag and holes 31b through which the bolts 32d are to be inserted are formed in selected positions around the opening 31a.

The inflator 32 comprises a cylindrical body 32a having gas ejecting holes 32b in the upper part and the annular flange portion 32c is formed around the cylindrical body 32a, with four downwardly projecting bolts 32d being fixed to the flange portion 32c.

The air bag device 30, having the inflator 32 placed within the air bag 31, is retained on the bottom member 20 by inserting bolts 32d through holes 31b in air bag 31 and holes 23b in the coupling ring portion 23, and then by fastening the bolts with nuts 33.

Production of the steering wheel W, used in the embodiment under consideration, starts with setting the core portion 11 and insert 18 in a specified mold. Then, cover 15 is formed by injection molding to prepare the steering wheel body 10. In a separate step, the air bag device 30 is connected to the bottom member 20. It should be noted here that when the inflator 32 has been placed into the air bag 31 with the bolts 32d projecting beyond the holes 31b, the air bag 31 should be folded in a predetermined compact form.

Subsequently, the support plate 35 carrying the membrane switch 40 on its upper surface is placed beneath the top portion 18g of the insert 18, following molding, as a component of the steering wheel body 10. The mounting projections 18i are inserted into and through mounting holes 38 and the exposed portions are thermally crimped to securely mount the membrane switch 40 on the steering wheel body 10. It should also be noted that the membrane switch 40 is preliminarily furnished with connection plates 47 and 48 by fastening with rivets 45.

In the next step, the mounting holes 23a in the bottom member 20 are brought into registry with mounting holes 13b in the steering wheel body 10 and bolts 27, as the securing means are threaded into the mounting holes 13b past the mounting holes 23a. Thereafter, the lower cover 50 is screwed to the mounting bosses 18b on insert 18, thereby completing the fabrication of the steering wheel W.

To connect the steering wheel W to the steering shaft 1, the following procedure may be followed. With the lock pin 26 removed from the spilt sleeve portion 25, the top end of the steering shaft 1 is inserted into the body 25a and the male threaded portion 26c of the lock pin 26 is threaded into the hole 25g past the hole 25e, thereby reducing the diameter of the body 25a. At the same time, the shank portion 26b of the lock pin 26 is fitted into the recess 3 beneath the serration 2 of the steering shaft 1, whereby the steering wheel W is connected to the steering shaft 1. It should be noted that connection plates 47 and 48 are electrically conducted to specified electrodes of the horn actuating circuit.

After the steering wheel W is installed on a vehicle, one may actuate the horn by depressing the top covering portion 17 so that specified ribs 17e are pushed inwardly to force upper plate 41 into contact with the lower plate 42.

The steering wheel W is such that cover 15 both the core covering portion 16, which covers the ring core 12 and the spoke cores 13, and also the top covering portion 17 which extends from the core covering portion 16 over the upper part of boss portion B. As a result, no parting line appears on the upper side of the steering wheel W which contributes to a better design of the upper side.

Additionally, the steering wheel W is such that the bottom member 20 has the connecting portion 24 located on its underside by which the upper end of the steering shaft 1 can be connected from below to the bottom member. Only the lower side of the steering wheel W need be used to accomplish its mounting on the steering shaft 1. Consequently, a completed steering wheel W can be connected to the steering shaft 1 in a single step.

The air bag device 30 is held between the bottom member 20 and the top covering portion 17. To assemble the steering wheel W, one may simply provide and hold the air bag device 30 on top of the bottom member 20 and use the bolts 27 to couple the bottom member 20 to the spoke cores 13 of the steering wheel body 10. During the assembly operation, the boss portion B of the steering wheel body 10 is covered only by the top covering portion 17 of cover 15 with the accommodating cavity 19 therebelow providing a sufficient space permitting the air bag device 30 to be provided in an appropriate and, hence, easy manner.

The steering wheel W is so adapted that if the air bag 31 in the air bag device 30 is inflated with the gas supplied from the inflator 32, the tearing portion 17a of the top covering portion 17 tears, as indicated by one-long-and-two-short dashed line in FIG. 2. Upon such tearing, the door portions 17b and 17c open allowing the air bag 31 to inflate to its fullest extent.

In the steering wheel W of the embodiment under consideration, cover 15, including the core covering portion 16 and top covering portion 17, is made of soft polyurethane. At the same time, insert 18 is made of a synthetic resin having a greater tensile strength than the soft polyurethane material used for cover 15 with portions of insert 18 being buried or embedded therein including portion 18g.

The support plate 35 is retained not by the top covering portion 17 per se, which is made of soft polyurethane, but rather by the portion 18g of insert 18 which is buried in the interior of the door portion 17c. The insert portion 18 has a greater tensile strength than the top covering portion 17. Hence, even if the door portion 17c of the top covering portion 17 opens by tearing the tearing portion 17a when the air bag 31 inflates, the support plate 35 does not shatter but is retained securely enough to follow the movement of the opening door portion 17c. It should also be noted that when the door portion 17c opens, the terminals 41a and 42a of the membrane switch 40 will deflect, thereby allowing the support plate 35 and the membrane switch 40 to move together.

Additionally, the top portions 18f and 18g coupled to the stem portion 18a of the insert via flexible coupling portions 18d and 18e, which are buried in the hinges 17d of the door portions 17b and 17c, are buried in door portions 17b and 17c of the top covering portion 17 made of soft polyurethane. Because of this design, the door portions 17b and 17c formed of the soft polyurethane material, have a lower tensile strength than the insert 18 and open smoothly without shattering allowing the air bag 31 to inflate to its fullest extent, thereby providing the advantages that were already described.

Because the air bag device 30 is mounted on the bottom member 20 by bolts 32d fitted on the flange portion 32c of the inflator 32, the air bag device 30 can be constructed of only two parts, the air bag 31 and the inflator 32. This reduction in the number of the components of the air bag device 30 contributes to the reduced number of steps involved in the production of the steering wheel W and, hence, to lower production costs.

Bottom member 20 is furnished with the deformable portion 22 which is capable of plastic deformation. Therefore, even if an impact force is exerted on the ring portion R, should the air bag device 30 be inoperative, the deformable portion 22 will undergo plastic deformation and the plane defined by the ring portion R can be oriented in directions perpendicular to the exertion of the impact force. As a result, the applied impact force is received by the ring plane which has a sufficiently wide area to mitigate the shock of the impact force.

Still another feature of the steering wheel W is that the membrane horn switch 40 is surrounded by the gap defining projection 36. This prevents switch 40 from being actuated even if the folded air bag 31 exerts an upwardly acting force as it restores toward an unfolded state following assembly. Additionally, the gap defining projection 36 allows membrane switch 40 to be located between the lower side of the door portion 17c and the spaced top surface 35a of support plate 35. This structural design assures a constant clearance between the rigid support plate 35 and the door portion 17c where the membrane switch 40 is positioned, and maintains a constant operating stroke for the membrane switch 40. Further, ribs 17e, provided in the door portion 17c, are located on those areas of the upper plate 41 which lie between spacers 43. This arrangement assures that whichever area of the door portion 17c, within the profile of the membrane switch 40, is pushed the rib 17e will depress an area between spacers 43, thereby insuring uniformity in the load that is applied.

While steering wheel W employs bolts 27 as the securing means by which the bottom member 20 is mounted on the steering wheel body 10, rivets or other approaches may be substituted for the bolts 27.

As noted previously, the mounting projections 18i are thermally crimped to retain the support plate 35. Alternatively, the mounting projections 18i may be provided with engagement hooks at their lower ends, which are inserted into the mounting holes 38 so that they come into engagement with the peripheral edges of those holes, whereby the support plate 35 is retained in place.

The connecting portion 24 which assists in connecting the bottom member 20 to the steering shaft 1 uses the lock pin 26 which fits into the recess 3 under the serration 2 of the steering shaft 1. It should, however, be noted that the connecting portion 24 may be of any structure that allows the top end of the steering shaft 1 to be connected from below to the bottom member 20. As long as this requirement is met, other structures may be adopted such as providing the steering shaft, rather than the bottom plate, with a mounting plate, a screw member or the like that can be bolted to or threaded into the bottom plate as taught in Japanese Patent Publication No. Sho. 63-134368, Japanese Utility Model Publication No. Hei. 2-24691, Japanese Utility Model Publication No. Hei 5-2388, etc.

The membrane switch 40 used in the embodiment described above is for actuating a horn but is goes without saying that switches for other purposes may also be employed. The structure of membrane switch 40 also is not limited to the two-layer type previously disclosed. Membrane switch 40 may be of a three-layer type. Further, the membrane switch in the embodiment outputs electric current in accordance with depression of the horn pad. However, it should be also allowable to adopt a membrane switch which can vary electric resistance, amount of electric current and dielectric constant thereof in accordance with depression of the horn pad.

In the embodiment described above, while the membrane switch 40 is located generally on the entire surface of the door portion 17c, the membrane switch 40 may be located within a more limited area of the door portion 17c. In this alternative case, with a view to providing good feel during manipulation of the switch, the top portion 18g of insert 18 placed above membrane switch 40 may be reduced in thickness or totally eliminated, with care being taken to assure the mounting projections 18i necessary for retaining the support plate 35.

While the invention has been described in connection with what are presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An air bag incorporating steering wheel comprising:
    an upper member comprising a cover member composed of soft material including an embedded insert and a core structure, said insert being embedded at least in a portion of a central area of said cover member;
    a rigid plate secured to a portion of an interior surface of said cover member;
    a switch located between said interior surface of said cover member and said rigid plate;
    a bottom member connected to said upper member; and
    an air bag located and secured between said upper member and bottom members.

2. A steering wheel according to claim 1, wherein said cover member includes an outer ring portion, a central portion and interconnecting spoke portions.

3. A steering wheel according to claim 2, wherein said central portion includes thinned wall areas defining at least one door portion and a hinge about which said door portion can bend, said door portion opening about said hinge upon inflation of said air bag.

4. A steering wheel according to claim 3, wherein said rigid plate is secured to a portion of said at least one door portion.

5. A steering wheel according to claim 1, wherein said insert comprises a top portion embedded in said at least one door portion, a depending stem portion and a flexible hinge portion embedded within said central portion.

6. A steering wheel according to claim 5, wherein said top portion includes a plurality of depending mounting projections for retaining said rigid plate.

7. A steering wheel according to claim 1, wherein said insert comprises a material having greater tensile strength than the material forming said cover member.

8. A steering wheel according to claim 1, wherein said air bag is connected to said bottom member.

9. A method of manufacturing a steering wheel comprising the steps of:

providing a core, an insert, an air bag device, a membrane switch, a support plate and a bottom member;

setting said core and said insert within a mold;

injecting resin into said mold to thereby form a steering wheel body;

retaining said air bag device on said bottom member;

disposing said membrane switch on said support plate;

fixing said support plate on said insert; and combining said steering wheel body with said bottom member.

10. A steering wheel which is connected to a steering wheel shaft, comprising:

a core member including a ring member;

a covering member made of soft synthetic resin, said covering member including a core covering portion which covers said core member and a top covering portion extending from said core covering portion and formed at the center of said ring member, said core covering portion and said top covering portion being integrally formed;

an air bag device located below said top covering portion;

a horn switch located between said air bag device and said top covering portion;

an insert embedded within said covering member; and a plate supporting said horn switch, said plate being mounted to said insert and protecting said horn switch from said air bag device.

11. A steering wheel according to claim 10, wherein said top covering portion further includes a tearing portion defining therewithin a door portion and a connecting hinge, said door portion opening around said hinge by tearing of said top covering portion along said tearing portion upon actuation of said air bag device.

12. A steering wheel according to claim 10, wherein said insert is comprised of a material having greater tensile strength than the material forming said covering member.

13. A steering wheel according to claim 11, wherein said insert comprises:

a top portion buried in said top covering portion;

a stem portion extending downward from a peripheral edge of said top portion and being buried in said core covering portion; and a flexible coupling portion for coupling together said top portion and said stem portion, said flexible coupling portion being buried in said covering member at said hinge.

14. A steering wheel according to claim 13, wherein said plate is made of a synthetic resin having a rigidity greater than the rigidity of said insert, said support plate being mounted to said top portion.

15. A steering wheel according to claim 14, wherein said plate has a projection formed along a peripheral edge thereof to define a horn stroke, said horn switch being planar and disposed on said plate inwardly of said projection.

16. A steering wheel according to claim 15, wherein said horn switch comprising:

an upper plate;

a lower plate;

a plurality of spaced apart insulating spacers provided between said upper plate and said lower plate; and a hinge portion corresponding to said hinge so as to deflect upon inflation of said air bag device.

17. A steering wheel according to claim 16, wherein said top covering layer further includes a plurality of ribs located so as to contact specified areas of a top surface of said upper plate, said specified areas corresponding to areas between said spacers.

18. A steering wheel according to claim 10, further comprising a bottom member located below said air bag device, said bottom member being connected to an upper end of the steering wheel shaft and including a deformable portion capable of plastic deformation.

19. A steering wheel according to claim 18, further comprising a lower cover secured at a lower part of said bottom member for covering an underside of said bottom member.

* * * * *